(12) United States Patent
Moore et al.

(10) Patent No.: US 9,758,254 B2
(45) Date of Patent: Sep. 12, 2017

(54) JET NOISE SUPPRESSOR

(71) Applicant: The Boeing Company, Chicago, IL (US)

(72) Inventors: Matthew D. Moore, Everett, WA (US); Kelly L. Boren, Gilbert, AZ (US); Hao Shen, La Palma, CA (US); Chester P. Nelson, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 255 days.

(21) Appl. No.: 14/537,957

(22) Filed: Nov. 11, 2014

(65) Prior Publication Data

US 2016/0130011 A1    May 12, 2016

(51) Int. Cl.
| | |
|---|---|
| B64D 33/00 | (2006.01) |
| F02K 1/34 | (2006.01) |
| F02K 1/46 | (2006.01) |
| F02K 1/28 | (2006.01) |
| F02K 1/48 | (2006.01) |
| F02K 1/82 | (2006.01) |
| F02K 1/38 | (2006.01) |
| F02K 1/36 | (2006.01) |

(52) U.S. Cl.
CPC ............ *B64D 33/06* (2013.01); *F02K 1/46* (2013.01); *F02K 1/28* (2013.01); *F02K 1/34* (2013.01); *F02K 1/36* (2013.01); *F02K 1/38* (2013.01); *F02K 1/386* (2013.01); *F02K 1/48* (2013.01); *F02K 1/82* (2013.01); *F02K 1/822* (2013.01); *F02K 1/827* (2013.01)

(58) Field of Classification Search
CPC ..... F02K 1/46; F02K 1/28; F02K 1/34; F02K 1/38; F02K 1/386; F02K 1/82; F02K 1/822; F02K 1/827; F02K 1/48; F02K 1/36; B64D 33/06
See application file for complete search history.

(56) References Cited

U.S. PATENT DOCUMENTS

| | | | | |
|---|---|---|---|---|
| 3,572,466 | A | * | 3/1971 | Hom ................... F02K 1/38 181/220 |
| 3,917,197 | A | * | 11/1975 | Francis ............. B64C 1/0009 244/130 |

(Continued)

OTHER PUBLICATIONS

Seiner et al., "Noise Reduction Technology for F/A-18 E/F Aircraft," *American Institute of Aeronautics and Astronautics*, AIAA Paper No. 2004-2972 (2004).

*Primary Examiner* — Pascal M Bui Pho
*Assistant Examiner* — Katheryn Malatek
(74) *Attorney, Agent, or Firm* — Walters & Wasylyna LLC

(57) ABSTRACT

A jet noise suppressor including a nozzle having a front end and an opposed rear end, spokes extending radially inward from the nozzle, the spokes defining vents, and a center-body connected to the spokes and in fluid communication with the vents, the center-body being positioned centrally within the nozzle and including a closed front end and an open rear end, wherein the front end of the nozzle entrains a first ambient airflow passing through the nozzle and exiting the rear end of the nozzle proximate a periphery of the nozzle, and wherein the vents entrain a second ambient airflow passing through the center-body and exiting the rear end of the nozzle proximate a center of the nozzle.

20 Claims, 10 Drawing Sheets

(56) References Cited

U.S. PATENT DOCUMENTS

| | | | | |
|---|---|---|---|---|
| 4,501,393 | A | * | 2/1985 | Klees ............... F02K 1/1207 |
| | | | | 181/215 |
| 4,567,960 | A | * | 2/1986 | Johnson ............... F02K 1/38 |
| | | | | 181/220 |
| 2007/0000234 | A1 | * | 1/2007 | Anderson ............ F02K 1/04 |
| | | | | 60/262 |
| 2008/0245925 | A1 | * | 10/2008 | Udall ................ B64C 5/02 |
| | | | | 244/52 |

\* cited by examiner

JET NOISE SUPPRESSOR

FIELD

This application relates to jet noise suppression and, more particularly, to suppressors for suppressing aircraft engine jet noise.

BACKGROUND

Aircraft, including commercial aircraft and military aircraft, play a vital role in modern society. Commercial aircraft quickly and efficiently transport people and goods, thereby facilitating commerce. Military aircraft serve various roles, including personnel transportation and ordinance delivery, thereby ensure a strong and effective national defense. However, the noise generated by aircraft engines can be off-putting to some and has prompted complaints.

The noise generated by aircraft engines varies from aircraft-to-aircraft. Typically, the noise intensity level is a function of the velocity of the jet plume emitted by the aircraft engine. For example, supersonic aircraft produce a much more intense noise than subsonic aircraft. Therefore, supersonic aircraft tend to be more off-putting, and prompt more complaints, than typical commercial aircraft.

Furthermore, the activity of the aircraft may also be an aircraft noise consideration. For example, Field Carrier Landing Practices (FCLPs) performed by the United States Navy involve a series of touch-and-goes using a relatively short runway, thereby simulating landing and take-off from the deck of an aircraft carrier. The flight patterns and airspeeds required during Field Carrier Landing Practice tend to produce intense noise that emanates over long distances. Therefore, Field Carrier Landing Practices were traditionally performed at outlying airfields (OLFs). However, over time, outlying airfields become less outlying, thereby bringing the general public into closer proximity with Field Carrier Landing Practices.

Accordingly, those skilled in the art continue with research and development efforts in the field of jet noise suppression.

SUMMARY

In one embodiment, the disclosed jet noise suppressor may include a nozzle including a front end and an opposed rear end, spokes extending radially inward from the nozzle, the spokes defining vents, and a center-body connected to the spokes and in fluid communication with the vents, the center-body being positioned centrally within the nozzle and including a closed front end and an open rear end, wherein the front end of the nozzle entrains a first ambient airflow passing through the nozzle and exiting the rear end of the nozzle proximate a periphery of the nozzle, and wherein the vents entrain a second ambient airflow passing through the center-body and exiting the rear end of the nozzle proximate a center of the nozzle.

In another embodiment, the disclosed aircraft may include a jet engine including a center axis and a rear end, the jet engine being capable of generating exhaust streams to propel the aircraft, and a jet noise suppressor including a nozzle coaxially aligned with the jet engine, the nozzle including a front end positioned relative to the rear end of the jet engine and an opposed rear end, spokes extending radially inward from the nozzle, the spokes defining vents, and a center-body connected to the spokes and in fluid communication with the vents, the center body being coaxially aligned with the jet engine and including a closed front end and an open rear end, wherein the front end of the nozzle entrains a first ambient airflow passing through the front end of the nozzle and exiting the rear end of the nozzle proximate a periphery of the nozzle to mix with the exhaust streams, and wherein the vents entrain a second ambient airflow passing through the center-body and exiting the rear end of the nozzle proximate a center of the nozzle to mix with the exhaust streams.

In yet another embodiment, the disclosed method for suppressing jet noise may include the steps of: (1) providing a jet engine including a center axis and a rear end, (2) providing a jet noise suppressor including a nozzle coaxially aligned with the jet engine, the nozzle including a front end positioned relative to the rear end of the jet engine and an opposed rear end, spokes extending radially inward from the nozzle, the spokes defining vents, and a center-body connected to the spokes and in fluid communication with the vents, the center body being coaxially aligned with the jet engine and including a closed front end and an open rear end, (3) generating exhaust streams from the rear end of the jet engine, (4) entraining the exhaust streams through the front end of the nozzle, (5) entraining a first ambient airflow through the front end of said nozzle, (6) mixing the first ambient airflow with the exhaust streams proximate a periphery of the nozzle, (7) entraining a second ambient airflow through the vents, and (8) mixing the second ambient airflow with the exhaust streams proximate a center of the nozzle.

Other embodiments of the disclosed jet noise suppressor and method will become apparent from the following detailed description, the accompanying drawings and the appended claims.

DETAILED DESCRIPTION

Figure 1:
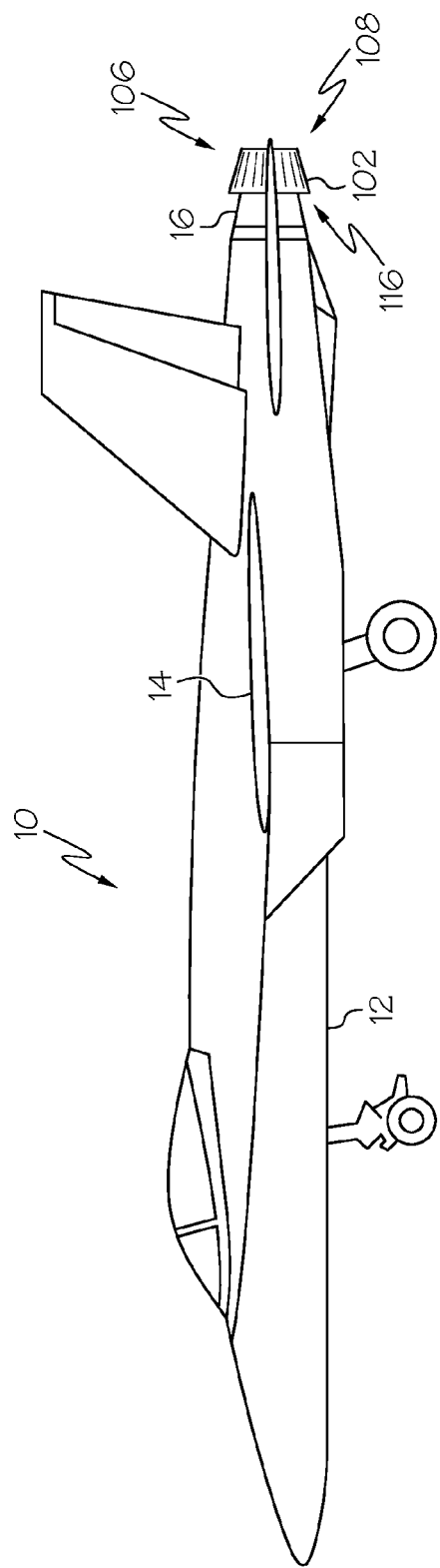
FIG. 1 is a side elevational view of an aircraft provided with one embodiment of the disclosed jet noise suppressor.
Figure 2:
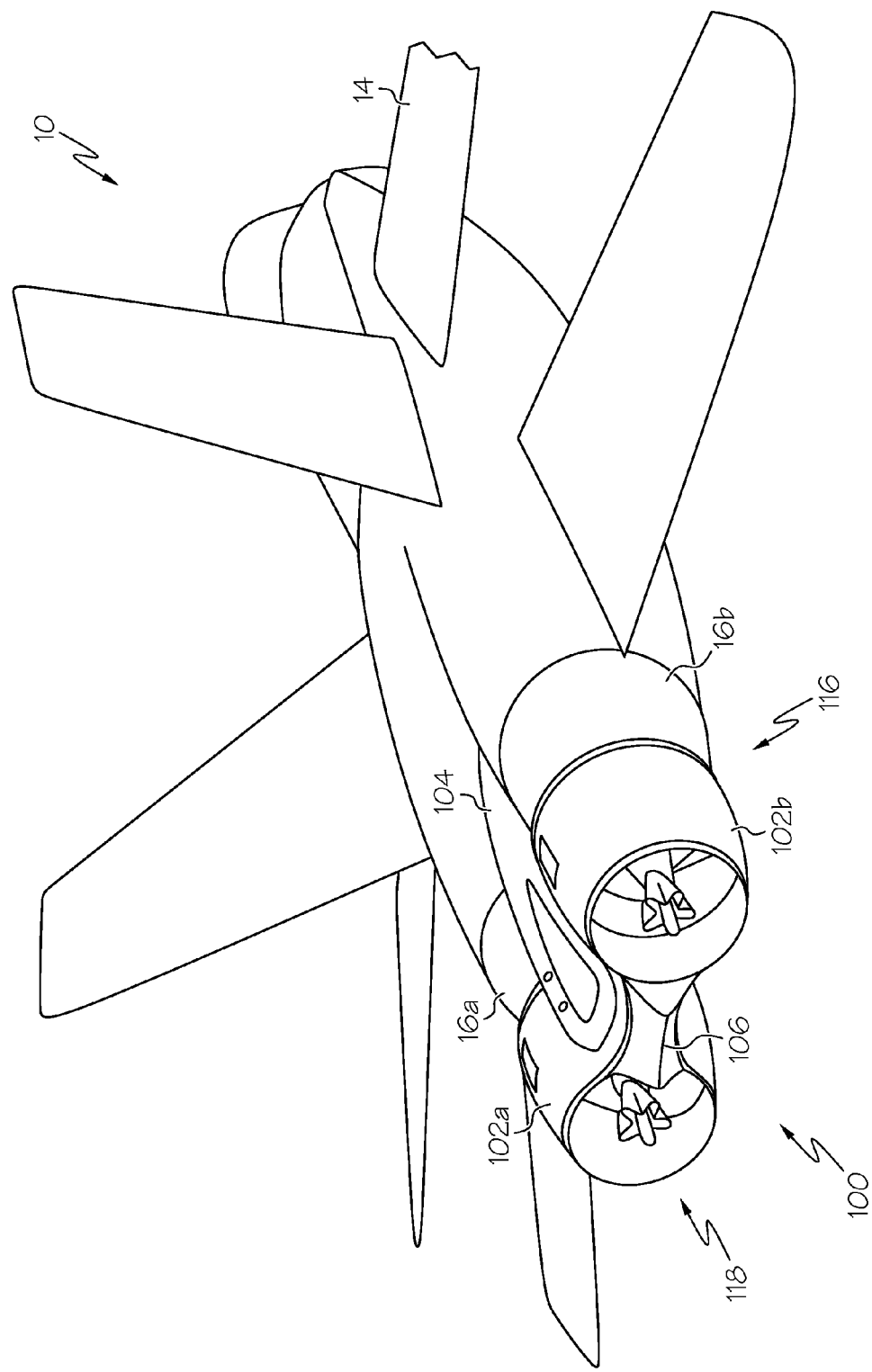
FIG. 2 is a rear and side perspective view of the aircraft of FIG. 1.

Referring to FIGS. 1 and 2, one embodiment of the disclosed jet noise suppressor, generally designated 100, is illustrated in use on an aircraft 10. Generally, the aircraft 10 may be any aircraft that utilizes a jet engine 16. While a military jet aircraft is illustrated in FIGS. 1 and 2, those skilled in the art will appreciate that the disclosed jet noise suppressor 100 may be used on commercial passenger jet aircraft, freighter jet aircraft, corporate jet aircraft, or private jet aircraft. The jet noise suppressor 100 may also find utility on other forms of jet powered mobile platforms, for example, jet powered rotorcraft. Thus, the disclosed jet noise suppressor 100 may find applicability with essentially any form of jet powered mobile platform where it is desirable to reduce jet noise.

Referring to FIG. 1, the aircraft 10 may include a fuselage 12, wings 14, and at least one jet engine 16. As is known by those skilled in the art, the aircraft 10 may have other configurations. The jet engine 16 may be adapted to propel the aircraft 10. In one example embodiment, the jet engine 16 may be a turbofan engine. The jet engine 16 may be contained or housed within an outboard nacelle mounted to the fuselage 12. In one example configuration, and as illustrated in FIG. 1, the jet engine 16 may be mounted on the rear of the fuselage 12. In other example configurations, the jet engine 16 may be mounted to other areas of the aircraft, for example, under the wing 14, over the wing 14, to the fuselage 12, etc.

Figure 4A:
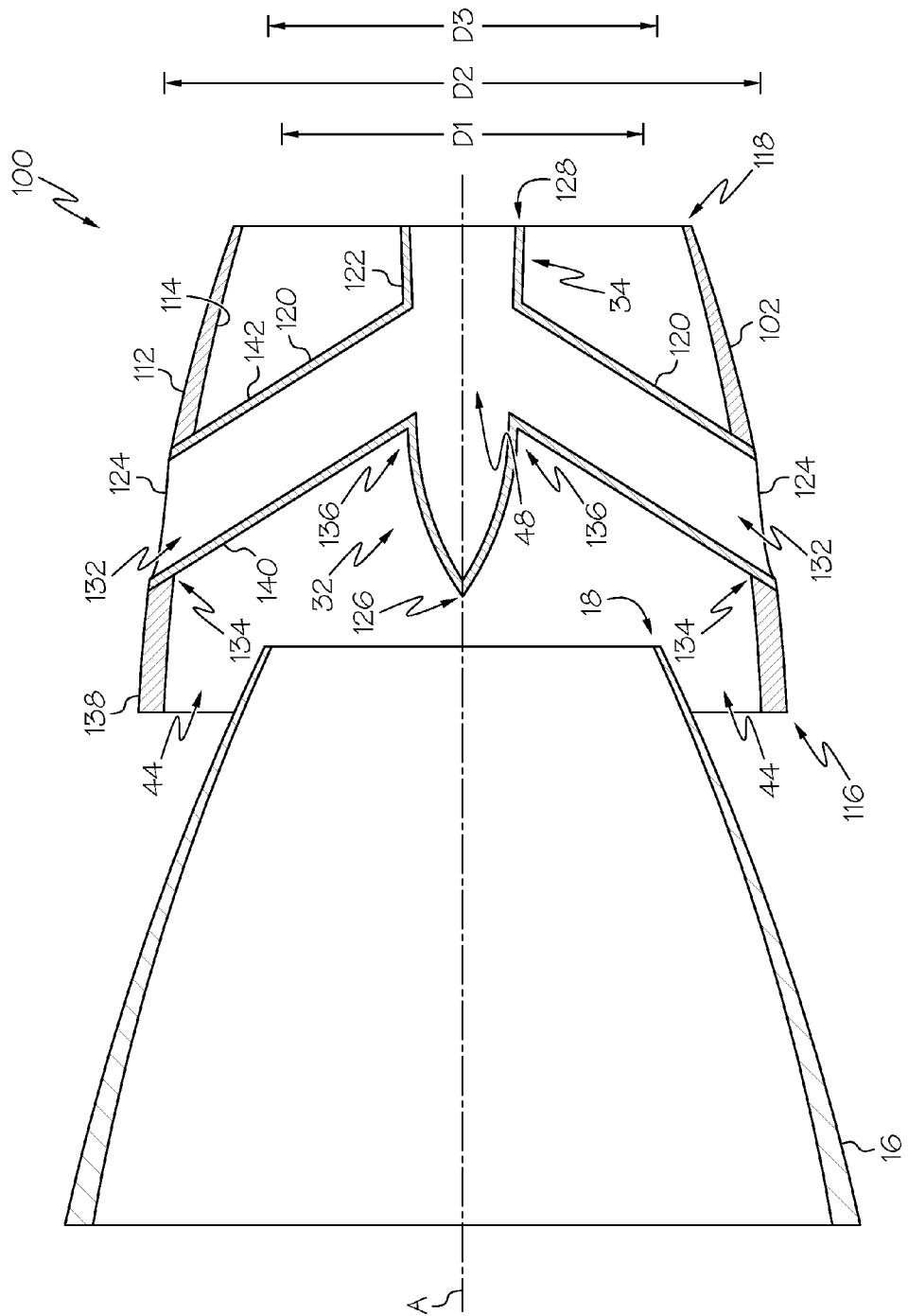
FIG. 4A is a schematic side elevational view, in section, of another embodiment of the jet noise suppressor.
Figure 4B:
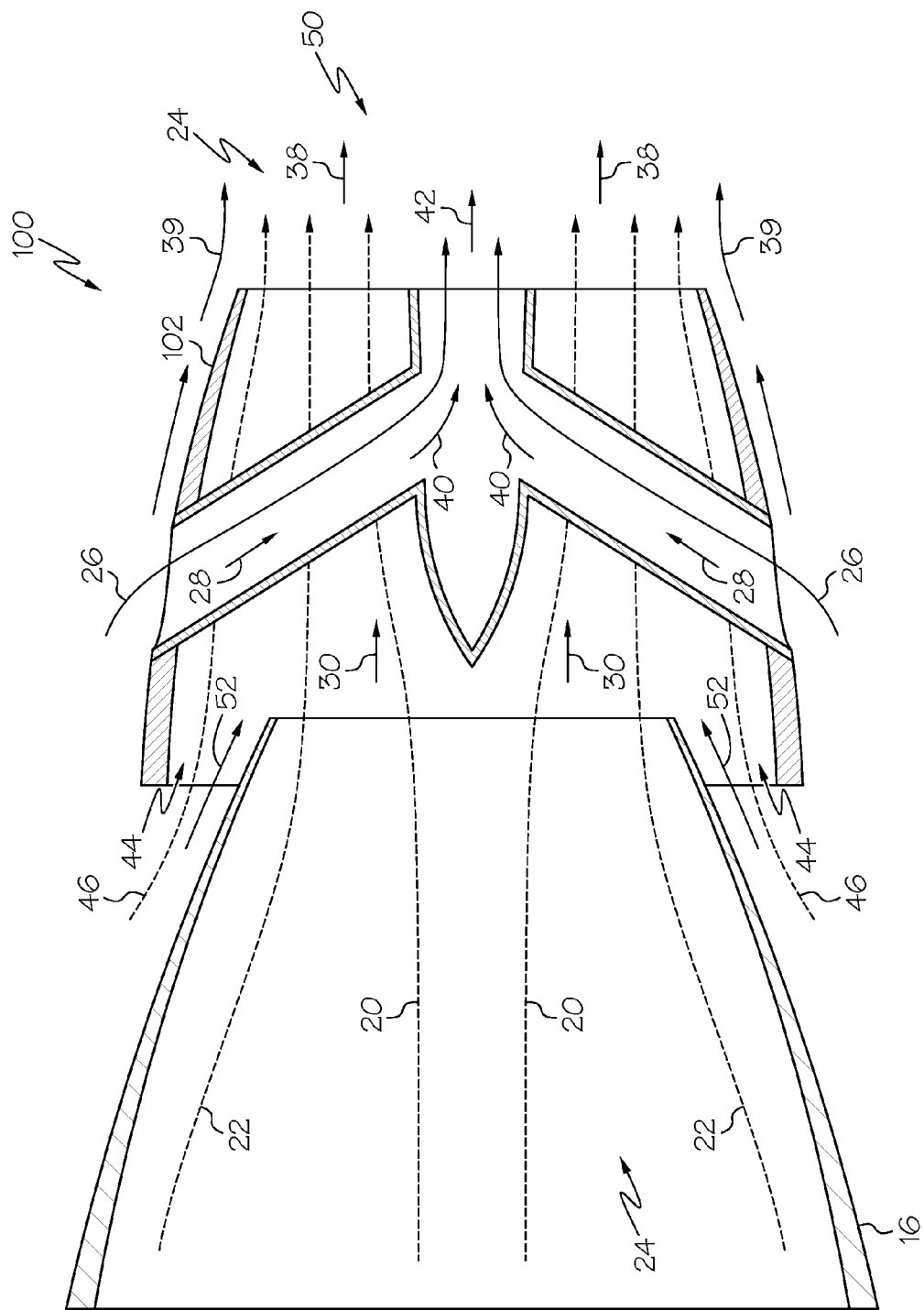
FIG. 4B is a schematic side elevational view, in section, of the jet noise suppressor of FIG. 4A illustrating airflow through the jet noise suppressor.

Referring briefly to FIGS. 4A and 4B, a typical jet engine 16 (e.g., turbofan engine) includes a longitudinally extending central axis A (FIG. 4A). As is known by those skilled in the art and, therefore, not illustrated in detail herein, as air enters a front (e.g., upstream) end of the jet engine 16, it passes through a fan and is split between a primary flow (e.g., core flow) and a secondary flow (e.g., bypass flow). The air of the primary flow first enters a low-pressure compressor and then a high-pressure compressor. The air of the primary flow is then mixed with fuel in a combustion chamber and the mixture is ignited and burned, thereby increasing its temperature. The resultant combustion products then flow into a high-pressure turbine and a low-pressure turbine, which extract energy from the combustion gases to turn the fan and compressors. The gases then expand through an inner (e.g., core) exhaust nozzle to produce useful thrust. The secondary flow is compressed by the fan, flows outside the core of the engine through an annular duct concentric with the core engine and is exhausted through an outer (e.g., bypass) exhaust nozzle as additional useful thrust. The two concentric exhaust streams 24 (e.g., the inner exhaust stream 20 and surrounding outer exhaust stream 22) join downstream of the exhaust area of the jet engine 16. Typically the outer (e.g., bypass) exhaust stream (i.e., the secondary flow) 22 exhausts through the outer (e.g., bypass) exhaust nozzle at a slow speed and the inner (e.g., core) exhaust stream (i.e., the primary flow) 20 exhausts through the inner (e.g., core) exhaust nozzle at a high speed. The two exhaust streams 24 then mix together and with the surrounding ambient airflow.

Referring again to FIG. 1, the jet engine noise suppressor 100 may be coupled to the aircraft 10 and positioned to the rear of the jet engine 16 to suppress noise generated by the jet engine 16. The noise may be suppressed continuously or during periods when the generated noise has the most environmental effects, such as during takeoff and landing. As one example, the jet noise suppressor 100 may be coupled (e.g., mechanically secured) to the fuselage 12. As another example, the jet noise suppressor 100 may be coupled to the jet engine 16 (e.g., to the nacelle containing the jet engine). As yet another example, the jet noise suppressor 100 may be coupled to an engine support structure (e.g., an engine pylon, support strut, etc.).

Referring generally to FIGS. 1 and 2, and particularly to FIGS. 4A and 4B, in one example embodiment, the jet noise suppressor 100 may include a nozzle 102. The nozzle 102 may be positioned such that a front (e.g., upstream) end 116 is positioned adjacent to a rear (e.g., downstream) end 18 (FIG. 4) of the jet engine 16 such that the exhaust streams 24 (e.g., the inner exhaust stream 20 and surrounding outer exhaust stream 22) exiting the exhaust of the jet engine 16 pass through the nozzle 102.

Referring to FIG. 2, in the illustrated configuration, the aircraft 10 may have two jet engines 16 (identified individually as 16a and 16b) supported on the rear of the fuselage 12, for example, by support struts (not shown). The jet engines 16a, 16b may be in a side-by-side configuration. Those skilled in the art will recognize that the aircraft 10 may have various other engine configurations. As examples, the aircraft 10 may have a single jet engine 16 supported on the rear of the fuselage 12, two or more jet engines 16 supported under the wings 14, and the like.

Figure 3:
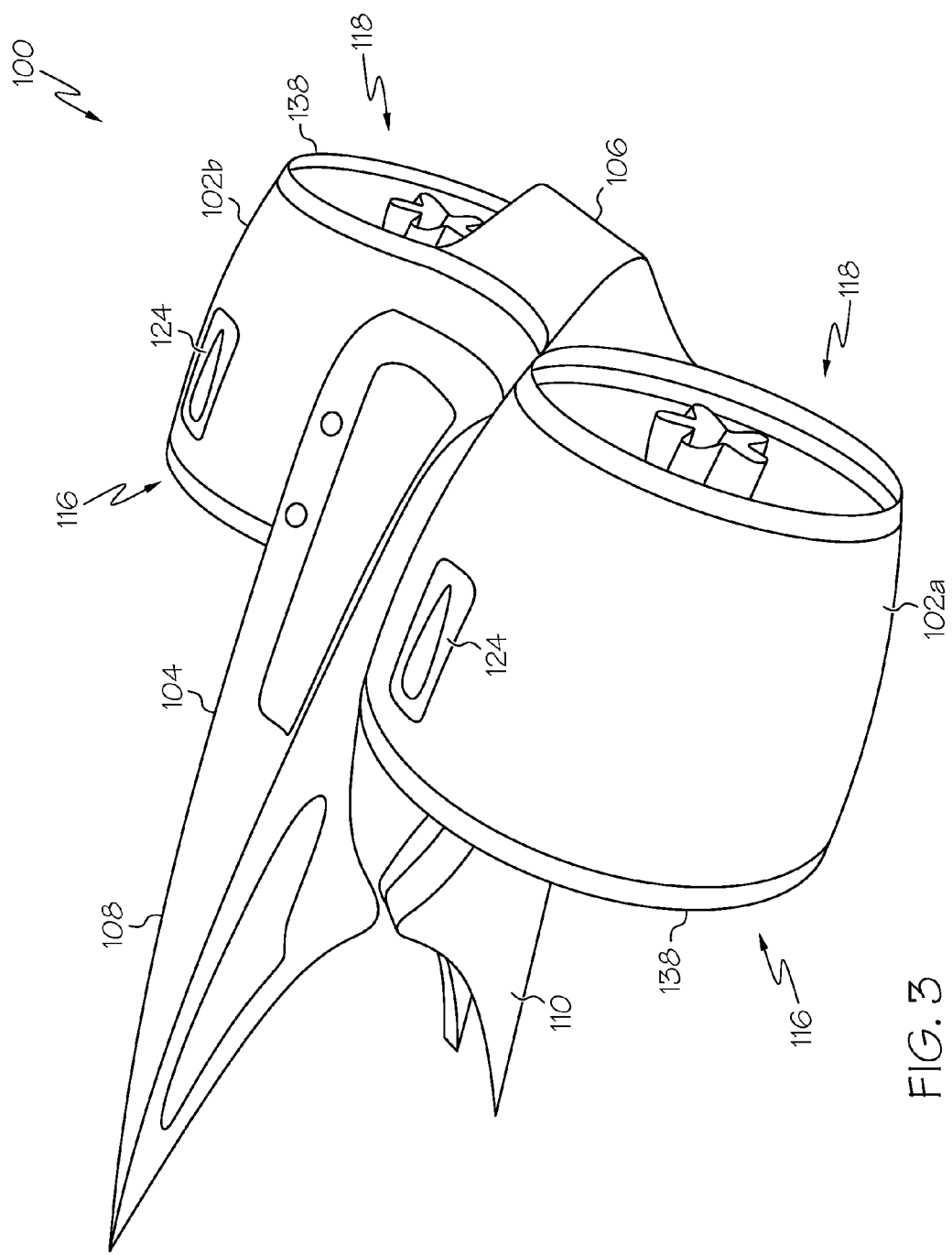
FIG. 3 is a side perspective view of the jet noise suppressor shown without the aircraft of FIG. 2.

Referring to FIGS. 2 and 3, in one example embodiment, the jet noise suppressor 100 may include two nozzles 102 (identified individually as 102a and 102b). Each jet engine 16a, 16b may have an associated nozzle 102, 102b of the jet noise suppressor 100 that suppresses noise from each individual jet engine 16a, 16b, as best illustrated in FIG. 2. The nozzles 102a, 102b may be in a side-by-side configuration to appropriately position each nozzle 102a, 102b relative to the respective jet engine 16a, 16b when the jet noise suppressor 100 is coupled to the aircraft 10.

In one example embodiment, the jet noise suppressor 100 may include a coupling member 104 configured to couple the nozzle 102 to the aircraft 10 and appropriately position the nozzle 102 relative to the read end 18 of the jet engine 16. The nozzle 102 may be positioned coaxially with the jet engine 16 along the central axis A (FIG. 4). As one example, and as best illustrated in FIG. 2, when the aircraft 10 includes two jet engines 16a, 16b, the coupling member 104 may be coupled to the aircraft 10 to appropriately position each nozzle 102a, 102b relative to the rear ends 18 of the jet engines 16a, 16b. As one example construction, the coupling member 104 may be coupled to an area of the fuselage 12 extending between and interconnecting the jet engines 16a, 16b (FIG. 2). This construction may be particularly beneficial as the area of the fuselage 12 extending between the jet engines 16a, 16b is typically reinforced in rear mounted twin-engine aircraft. As another example construction, the coupling member 104 may be coupled to other areas of the fuselage 12 and/or the jet engines 16a, 16b.

As another example (not shown), when the aircraft 10 includes a single jet engine 16 or multiple jet engines 16 spaced far apart from one another, the coupling member 104 may be coupled to the aircraft 10 to appropriately position the nozzle 102 relative to the respective jet engine 16. As one example construction, the coupling member 104 may be coupled to the fuselage 12 and/or the jet engine 16.

In one example embodiment (e.g., constructions of the jet noise suppressor 100 having two nozzles 102a, 102b), the jet noise suppressor 100 may include a central support member 106 configured to interconnect the nozzles 102a, 102b. The support member 106 may appropriately position the nozzles 102a, 102b relative to one another. For example, the support member 106 may space the nozzles 102a, 102b apart from one another at positions substantially matching the spaced apart relationship between the two jet engines 16.

In one example construction of the jet noise suppressor 100 having two nozzles 102a, 102b, the coupling member 104 may extend forward of the support member 106 for connection to the aircraft 10 (e.g., to the fuselage 12 and/or the jet engines 16a, 16b). As one example, the coupling member 104 may be integral to the support member 106 (e.g., the coupling member 104 and the support member 106 may define a unitary structure). As another example, the coupling member 104 and the support member 106 may be discrete (e.g., individually separate) structures connected to one another.

Referring to FIG. 3, in one specific, non-limiting example embodiment, the coupling member 104 may include a first (e.g., upper) coupling portion 108 and an opposing second (e.g., lower) coupling portion 110. The first coupling portion 108 and the second coupling portion 110 may be spaced apart a sufficient distance to receive a portion of the fuselage 12 therebetween. The first coupling portion 108 may be connected to an upper surface of the fuselage 12 (e.g., the area of the fuselage 12 extending between the jet engines 16a, 16b) (FIG. 2). The second coupling portion 110 may be connected to an opposing lower surface of the fuselage 12 (e.g., the area of the fuselage 12 extending between the jet engines 16a, 16b).

The particular configuration and/or shape of the coupling member 104 (e.g., the first coupling portion 108 and/or the second coupling portion 110) may depend on the type and/or configuration of the aircraft 10 and/or the location upon the fuselage 12 and/or the jet engines 16 the jet noise suppressor 100 is connected. In general, the coupling member 104 and/or the support member 106 may have an aerodynamic outer surface configured to reduce drag.

In one example embodiment, the jet noise suppressor 100 may be removably coupled to the aircraft 10. As one example, the coupling member 104 (e.g., the first coupling portion 108 and/or the second coupling portion 110) may be removably connected to the aircraft 10 (e.g., to the fuselage 12 and/or the jet engine 16). Removable connection of the jet noise suppressor 100 to the aircraft 10 may provide for utilization of the jet noise suppressor 100 to reduce jet noise during particular maneuvers, such as during Field Carrier Landing Practice missions, without the need to permanently retrofit the aircraft 10 with an alternative noise-reducing ejector. As one example construction, the coupling member 104 may be connected to the aircraft 10 with mechanical fasteners (not shown) that may be manually installed and removed to connect and disconnect the jet noise suppressor 100 to the aircraft 10, for example, by a ground crew, to return the aircraft 10 to its original state. As another example construction, the coupling member 104 may be connected to the aircraft 10 with frangible fasteners (not shown) that may be ejected to discard the jet noise suppressor 100 during flight and returning the aircraft 10 to its original state.

In another example embodiment, the jet noise suppressor 100 may be permanently coupled to the aircraft 10. As one example, the coupling member 104 (e.g., the first coupling portion 108 and/or the second coupling portion 110) may be permanently connected to the aircraft 10 (e.g., to the fuselage 12 and/or the jet engine 16).

Referring to FIGS. 4A and 4B, in one example embodiment, the nozzle 102 may include a wall structure 138 (FIG. 4A) extending circumferentially around central axis A defining an ejector shroud. The wall structure 138 may include an outer wall 112 and an inner wall 114. The wall structure 138 may extend from the front (e.g., upstream) end 116 to (e.g., and terminate at) a rear (e.g., downstream) end 118 of the nozzle 102. The propulsion exhaust streams 24 (e.g., the outer exhaust stream 22 and the inner exhaust stream 20) may enter the front end 116 of the nozzle 102, be entrained within the nozzle 102, and exit from the rear end 118 of the nozzle 102.

In one example construction, the wall structure 138 may be fabricated from or include a sound absorbing material. For example, the inner wall 114 may be fabricated from high-temperature acoustic foam or other acoustically porous material to effectively absorb noise from within the nozzle 102.

Figure 5:
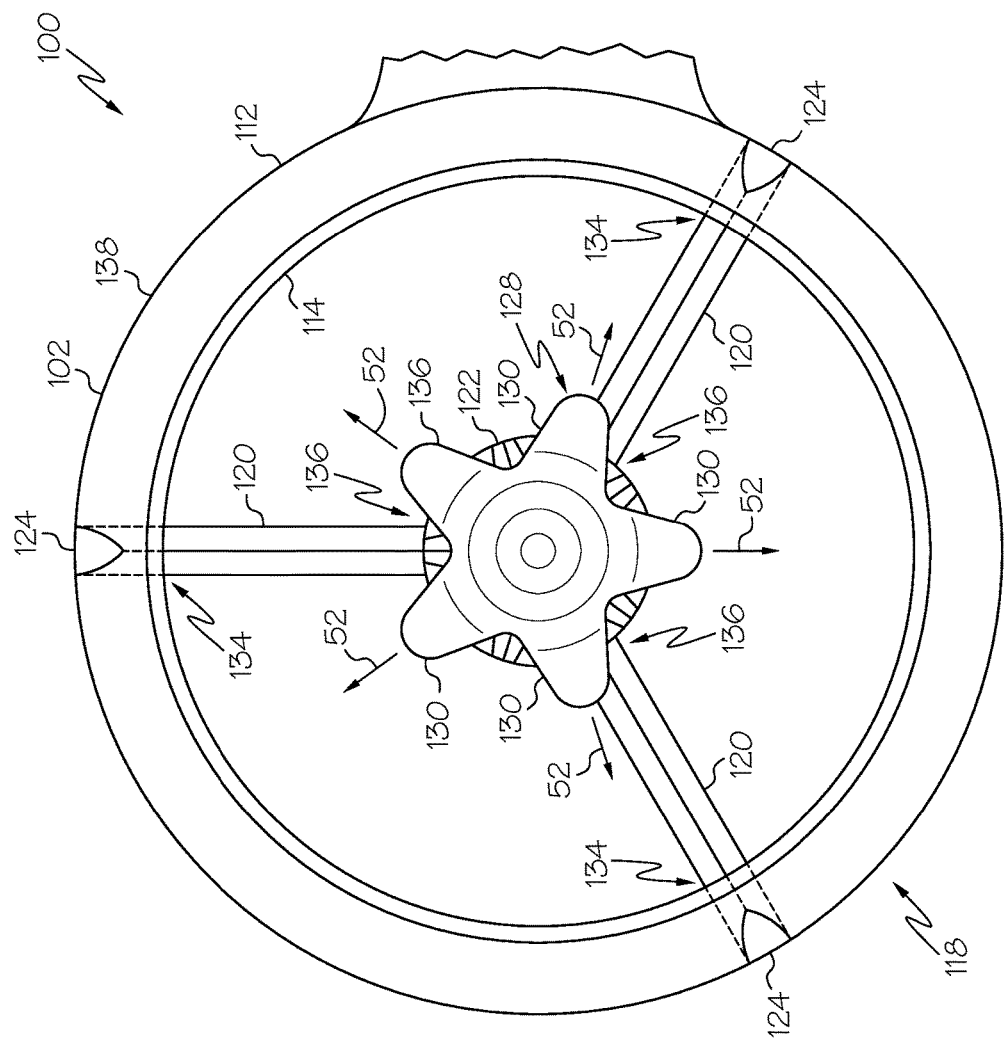
FIG. 5 is a partial, schematic rear end view of another embodiment of the jet noise suppressor.

FIGS. 4A, 4B and 5 illustrate a single nozzle 102 of the disclosed jet noise suppressor 100 as associated with a single jet engine 16. However, those skilled in the art will appreciate that when the jet noise suppressor 100 includes two or more nozzles 102 (e.g., nozzles 102a, 102b in FIG. 3), each nozzle 102a, 102b, etc. may be substantially the same as the nozzle 102 illustrated in FIGS. 4A, 4B and 5.

Referring still to FIGS. 4A and 4B, the nozzle 102 may be positioned relative to the rear end 18 of the jet engine 16. The nozzle 102 may be positioned coaxially with the jet engine 16. For example, both the jet engine 16 and the nozzle 102 may have the same longitudinal center axis A. In one example configuration, the front end 116 of the nozzle 102 may be positioned proximate (e.g., at or near) the rear end 18 of the jet engine 16. In another example configuration, and as best illustrated in FIG. 4A, the rear end 18 of the jet engine 16 may be partially received within the front end 116 of the nozzle 102.

Referring to FIG. 4A, the rear end 18 of the jet engine 16 may have a diameter D1. The front end 116 of the nozzle 102 may have a diameter D2. The diameter D2 of the front end 116 of the nozzle 102 may be larger than the diameter D1 of the rear end 18 of the jet engine 16 such that an open area 44 is defined between the rear end 18 of the jet engine 16 and the front end 116 of the nozzle 102.

The wall structure 138 of the nozzle 102 may converge toward the rear end 118 of the nozzle 102. As one example, the rear end 118 of the nozzle 102 may have a diameter D3. Diameter D3 of the rear end 118 may be smaller than diameter D2 of the front end 116 of the nozzle 102. For example, diameter D3 of the rear end 118 of the nozzle 102 may be approximately equal to diameter D1 of the rear end 18 of the jet engine 16.

In certain configurations of the jet engine 16, the diameter D1 may be variable (e.g., a variable geometry engine nozzle). For example, variable geometry jet engines may accelerate the available gas to subsonic, sonic, or supersonic velocities depending on the power setting of the engine, their internal shape and the pressures at entry to, and exit from, the nozzle of the engine. In such a configuration, the nozzle 102 of the jet noise suppressor 100 may be configured to have a variable diameter D2 at the front end 116. Thus, the diameter D2 of the front end 116 of the nozzle 102 may vary in response to changes in the diameter D1 of the rear end 18 of the jet engine 16 to maintain the open area 44.

Referring to FIGS. 4A, 4B and 5, the jet noise suppressor 100 may include hollow spokes 120 extending radially inward from the wall structure 138 (e.g., the inner wall 114) and terminating at a hollow center-body 122. In one example construction, the jet noise suppressor 100 may include two spokes 120. In another example construction, the jet noise suppressor 100 may include three spokes 120, as best illustrated in FIG. 5. Other example constructions of the jet noise suppressor 100 may include any other number of spokes 120 (e.g., one, four, etc.). The total number of spokes 120 (e.g., an optimal number of spokes 120) in any construction of the jet noise suppressor 100 may be dictated, for example, by a desired airflow entrainment through the nozzle 102 (e.g., entrainment of ambient airflow through the spokes 120), structural requirements of the jet noise suppressor 100, and/or internal drag or blockage limitations.

Referring to FIGS. 4A and 4B, the exhaust streams 24 (e.g., the inner exhaust stream 20 and the outer exhaust stream 22) may enter the nozzle 102 through the front end 116 of the nozzle 102 and be entrained within an area 32 defined by the wall structure 138 of the nozzle 102 (e.g., in the direction of directional arrow 30). The exhaust streams 24 may flow through an area 34 defined between the wall structure 138 of the nozzle 102 and the center-body 122 and around the spokes 120 and the center-body 122 (e.g., in the direction of directional arrow 36). The exhaust stream 24 may exit the rear end 118 of the nozzle 102 (e.g., in the direction of directional arrow 38).

Referring still to FIGS. 4A and 4B, the open area 44 may be configured to entrain an ambient airflow 46 (also referred to herein as a first ambient airflow 46) flowing between the wall structure 138 of the nozzle 102 and the exterior of the jet engine 16 (e.g., in the direction of directional arrow 52). The first ambient airflow 46 may enter the nozzle 102 through the open area 44 at the front end 116 of the nozzle 102 and be entrained within the area 32 defined by the wall structure 138 of the nozzle 102 (e.g., in the direction of directional arrow 30). The first ambient airflow 46 may flow through the area 34 defined between the wall structure 138 of the nozzle 102 and the center-body 122 and around the spokes 120 and the center-body 122 (e.g., in the direction of directional arrow 36). The first ambient airflow 46 may exit the rear end 118 of the nozzle 102 substantially about a periphery of the nozzle 102 (e.g., in the direction of directional arrow 38).

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of a lower-numbered item (e.g., a "first") and/or a higher-numbered item (e.g., a "third").

The first ambient airflow 46 exiting of the rear end 118 of nozzle 102 may mix with the exhaust streams 24 (e.g., the inner exhaust stream 20 and the outer exhaust stream 22) downstream of the rear end 118 of the nozzle 102, which reduces the jet noise produced by the jet engine 16.

Each spoke 120 may define an air induction vent 132 (e.g., a tube, channel, duct, etc.) extending through the wall structure 138 (e.g., inner wall 114 and outer wall 112) of the nozzle 102 and having an ambient airflow inlet 124 in fluid communication with the center-body 122.

The vent 132 may be configured to entrain an ambient airflow 26 (also referred to herein as a second ambient airflow 26) flowing over the outer wall 112 of the nozzle 102 (e.g., in the direction of directional arrows 28). The second ambient airflow 26 may flow through the vent 132 and be entrained within an area 48 defined by the center-body 122 (e.g., in the direction of directional arrow 40). The second ambient airflow 26 may exit the rear end 128 of the center-body 122 substantially at a center of the rear end 118 of the nozzle 102 (e.g., in the direction of directional arrow 42).

The second ambient airflow 26 exiting the center-body 122 and, thus, the rear end 118 of the nozzle 102 may be substantially surrounded by the exhaust steams 24 (e.g., the inner exhaust stream 20 and the outer exhaust stream 22) also exiting the rear end 118 of the nozzle 102 and mix with the exhaust streams 24 downstream of the rear end 118 of the nozzle 102, which reduces the jet noise produced by the jet engine 16.

Referring to FIG. 4A, in one example embodiment, the spoke 120 may have an airfoil shape including a leading (e.g., upstream) edge 140 and a trailing (e.g., downstream) edge 142. The spoke 120 may include a thin profile (e.g., having a relatively low thickness to chord ratio). The leading edge 140 and/or the trailing 142 may be rounded or sharp. Those skilled in the art will recognize that the shape of spoke 120 may be optimized to reduce drag (e.g., in supersonic flow) while achieving a desired entrainment of the second ambient airflow 26 (e.g., through the vent 132).

Figure 7:
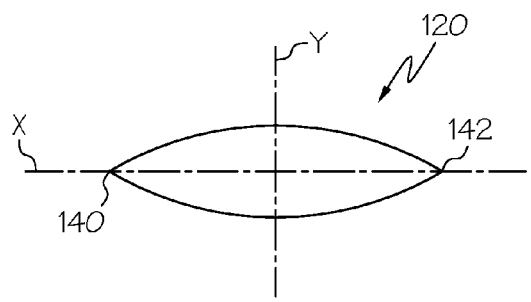
FIG. 7 is a schematic end view of one embodiment of a spoke of the disclosed jet noise suppressor.
Figure 8:
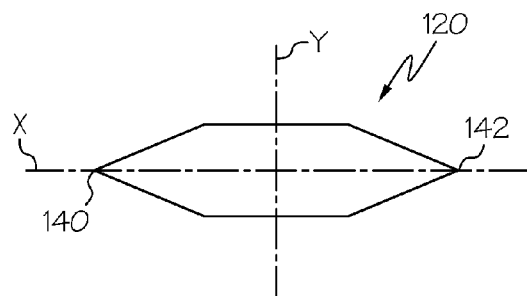
FIG. 8 is a schematic end view of another embodiment of the spoke.

Referring to FIG. 7, in one example construction, the spoke 120 may include a biconvex cross-sectional shape (e.g., convex on both sides) formed from circular arcs (e.g., for supersonic flow). Referring to FIG. 8, in another example construction, the spoke 120 may include a wedge-slab-wedge cross-sectional shape (e.g., for supersonic flow). In yet another example construction (not shown), the spoke 120 may include a double wedge cross-sectional shape (e.g., for supersonic flow). The spoke 120 may be symmetric, semi-symmetric, or asymmetric, for example, about an axis of symmetry X and/or Y.

Referring to FIG. 4A, in one example construction, the vent 132 defined by the spoke 120 may have a generally circular cross-sectional shape. In another example construction, vent 132 may have generally ovular cross-sectional shape. Other cross-sectional shapes of the vent 132 are also contemplated.

Figure 6:
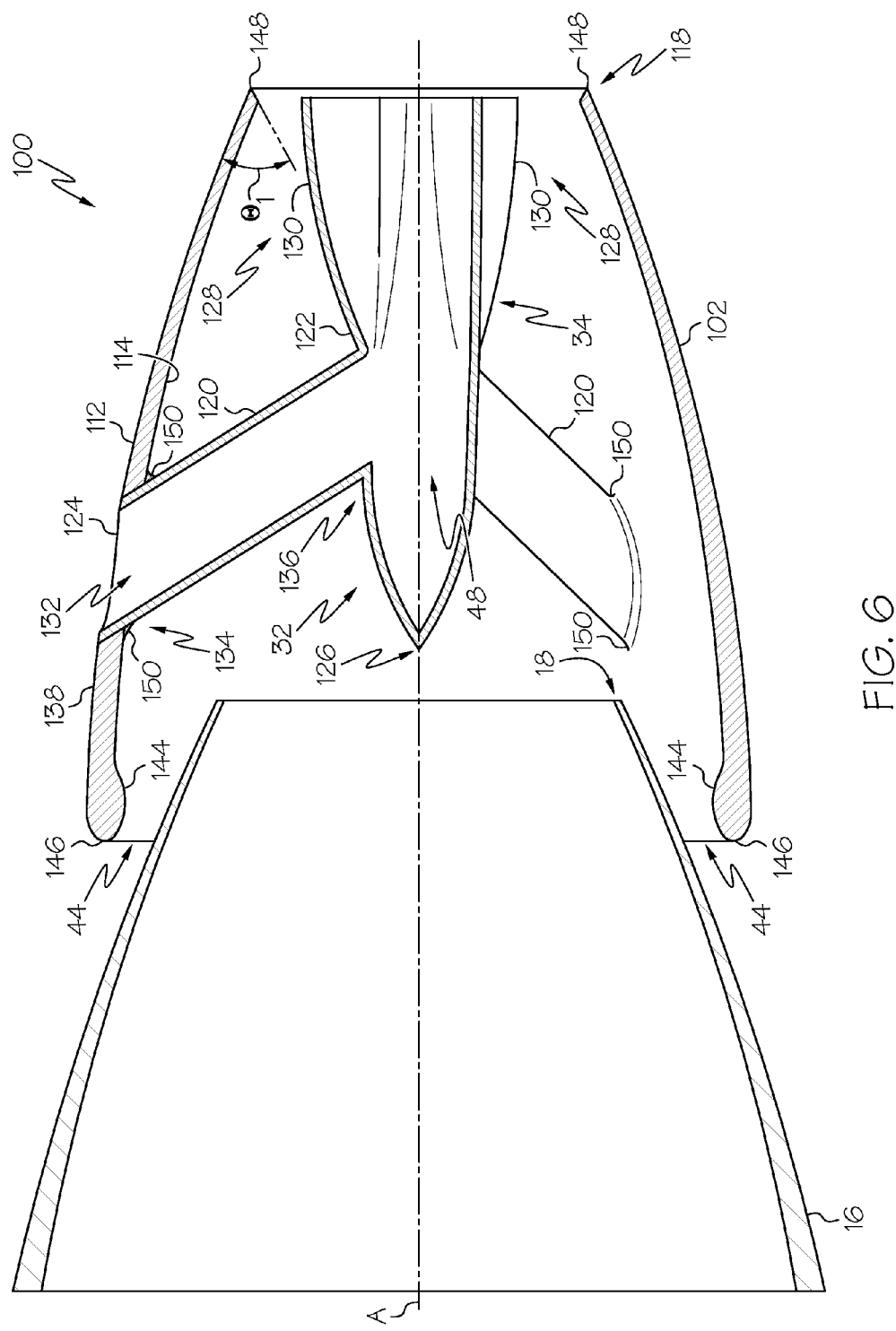
FIG. 6 is a side elevational view, in section, of another embodiment of the jet noise suppressor.

Referring to FIGS. 4A, 5 and 6, the center-body 122 may be connected to and supported by the spokes 120 substantially at a center of the nozzle 102. In one example construction, the center-body 122 may be coaxially aligned with the jet engine 16. For example, the jet engine 16, the nozzle 102, and the center-body 122 may have the same longitudinal center axis A. A closed front end 126 of the center-body 122 may be spaced away from the front end 116 of the nozzle 102. An open rear end 128 of the center-body 122 may be proximate the rear end 118 of the nozzle 102.

The spokes 120 may include a first end 134 coupled to the wall structure 138 of the nozzle 102 and a second end 136 coupled to the center-body 122. In one example construction, the first end 134 of the spoke 120 may be positioned proximate a mid-point of the nozzle 102. The second end 136 may be positioned proximate a mid-point of the center-body 122. The spokes 120 may extend toward the rear end 118 of the nozzle 102 and be disposed at a non-zero angle relative to the center axis A.

Referring to FIG. 6, in one example embodiment, the front end 116 of the nozzle 102 may be shaped for internal and external aerodynamics to align and entrain the first ambient airflow 46 (FIG. 4B) into the nozzle 102 through the open area 44 (FIG. 4B). As one example, the front end 116 of the nozzle 102 may be asymmetric between the outer wall 112 and the inner wall 114 at a leading (e.g., upstream) edge 146 of the wall structure 138. As another example, the leading edge 146 of the wall structure 138 may include a camber 144 proximate (e.g., at or near) the front end 116 of the nozzle 102, as best illustrated in FIG. 6. The camber 144 formed at the front end 116 of the nozzle 102 may create lift, which due to the direction of the first ambient airflow 46 may become forward thrust. As another example (not shown), the leading edge 146 of the wall structure 138 may include a relative sharp edge. As yet another example (not shown), the leading edge 146 of the wall structure 138 may include a blunted (e.g., rounded) edge.

Referring still to FIG. 6, in one example embodiment, the wall structure 138 may angled proximate the rear end 118 of the nozzle 102. As one example, the inner wall 114 may be disposed at a non-zero angle $\Theta_1$ relative to the outer wall 112 at a trailing (e.g., downstream) edge 148 of the wall structure 138. The angle $\Theta_1$ may be chosen to intercept and redirect a positive pressure of a center body cone shock creating an additional forward thrust to offset center body wave drag. As one example, $\Theta_1$ may be between approximately 25 degrees and 110 degrees. As another example, $\Theta_1$ may be between approximately 90 degrees and 90 degrees. As yet another example, $\Theta_1$ may be approximately 35 degrees.

Referring still to FIG. 6, in one example embodiment, an interface between the spoke 120 and the wall structure 138 (e.g., the inner wall 114) of the nozzle 102 (e.g., at the first end 134 of the spoke 120) may include a fillet 150. The fillet 150 may reduce drag at the intersection of the spoke 120 and the wall structure 138 and smooth a local flow at the first end 134 of the spoke 120.

Referring to FIGS. 5 and 6, in one example embodiment, the rear end 128 of the center-body 122 may include lobes 130. The lobes 130 may extend outward from the center-body 122. As one example, the lobes 130 may extend radially from the center axis A. The lobes 130 may be equally spaced apart relative to one another. In one example configuration, the rear end 128 of the center-body 122 may include five lobes 130, as best illustrated in FIG. 5. Other numbers of lobes 130 (e.g., two, three, four, six, etc.) are also contemplated. For example, the particular number of lobes 130 may be dictated by area and mass flow ratios.

The lobes 130 may shape the exit of the area 48 defined proximate the rear end 128 of the center-body 122. The lobes 130 may direct a portion of the ambient airflow 26 from proximate a center of the nozzle 102 toward a periphery of the nozzle 102 (e.g., in the direction of directional arrow 52) (FIG. 5) further mixing the ambient airflow 26 with the surrounding exhaust streams 24 (e.g., the inner exhaust stream 20 and the outer exhaust stream 22), which further reduces the jet noise produced by the jet engine 16.

Figure 9:
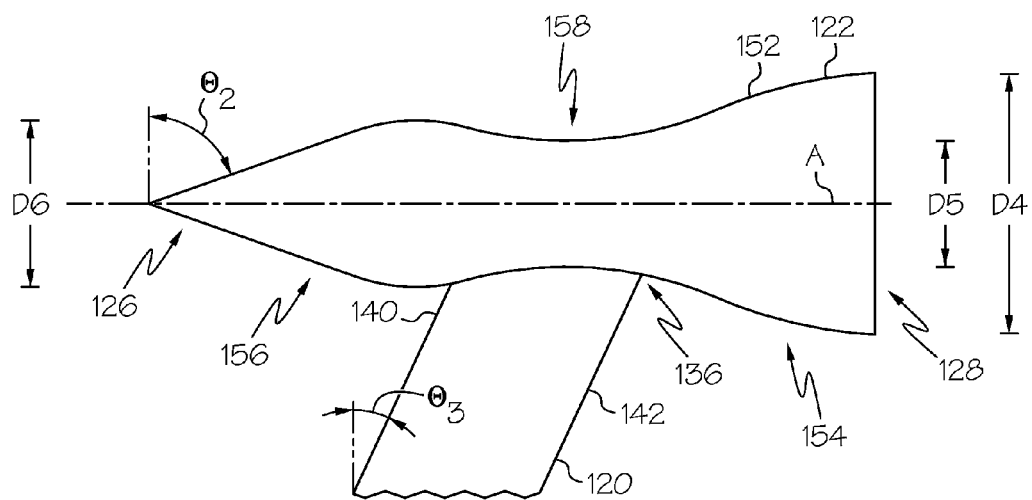
FIG. 9 is a schematic side elevational view of one embodiment of a center-body of the disclosed jet noise suppressor.

Referring to FIG. 9, in one example embodiment, the center-body 122 may include a wall structure 152 extending circumferentially around the central axis A. The wall structure 152 may extend from the front (e.g., upstream) end 126 to (e.g., and terminate at) the rear (e.g., downstream) end 128 of the center-body 122. The center-body 122 may include a main portion 154 and a front-end portion 156. The main portion 154 may extend from the rear end 128 toward the front end 126 of the center-body 122. The front-end portion 156 may extend from the main portion 154 to the front end 126 of the center-body 122.

In one example construction, the wall structure 152 may be contoured. As one example, the center-body 122 may have a variable cross-sectional shape (e.g., diameter). For example, the shape of the contoured wall structure 152 may be configured to minimize wave drag along an exterior of the center-body 122, for example, at the intersection of the spokes 120 and the wall structure 152.

As one example, the variable cross-sectional shape of the center-body 122 may be defined by one or more inwardly curved (e.g., concave) regions 156 of the center-body 122 (e.g., of the wall structure 152). Thus, the inwardly curved regions 156 may locally modify the cross-sectional area (e.g., area 48) (FIG. 4A) of the center-body 122. As one example, the inwardly curved region 156 may extend all the way around the circumference of the center-body 122. As another example, the inwardly curved region 156 may extend only partway around the circumference of the center-body 122. For example, the inwardly curved region 156 may be limited to an indentation in the center-body 122 (e.g., the wall structure 152) in the vicinity of the intersection of the spoke 120.

As one specific, non-limiting example, the main portion 154 may include a generally "hourglass" or "coke bottle" shape and the front-end portion 156 may include a generally conical shape and terminate at a point (e.g., at the front end 126). As one example, the center-body 122 (e.g., the main portion 154) may include a diameter D4 proximate the rear end 128, a diameter D5 proximate a middle region, and a diameter D6 proximate the front end 126. The diameter D4 may be greater than, equal to, or less than the diameter D6. The diameter D5 may be less than the diameters D4 and D6, thus, forming the inwardly curved region 156 of the center-body 122.

The spoke 120 (e.g., at the second end 136) may be coupled to the center-body 122 at the inwardly curved (e.g., middle) region 156. The inwardly curved region 156 of the center-body 122 (e.g., of the wall structure 152) at the intersection of the spoke 120 and the center-body 122 may minimize the rate of local duct area change and compensate for aerodynamic disturbances created by the volume flow displaced by the spoke 120, which may propagate through the nozzle 102. Thus, varying the cross-sectional area of the center-body 102 along the center axis A (e.g., forming one or more inwardly curved regions 156) may minimize local super-velocities in the duct and minimize or avoid the formation of shock waves or flow non-uniformity that would contribute to thrust loss or acoustic sources.

In another example construction (not shown), the main portion 154 of the center-body 122 may include additional inwardly curved regions, for example, extending toward the rear end 128 of the center-body 122. In another example construction (not shown), the main portion 154 of the center-body 122 may include a cylindrical shape (e.g., circular in cross-section and having a constant diameter) and the front-portion 156 may include the conical shape. In yet another example construction (not shown), the main portion 154 and the front-end portion, in combination, may include a generally conical shape.

Referring still to FIG. 9, the conical-shape of the center-body 122 at the front end 126 (e.g., of the front-end portion 156) may define a non-zero entry angle $\Theta_2$. In one example construction, the non-zero entry angle $\Theta_2$ may be an acute angle configured (e.g., optimized) to minimize wave drag. As one example, $\Theta_2$ may be between approximately 40 degrees and 70 degrees.

Referring still to FIG. 9, the spoke 120 may be disposed at a non-zero sweep angle $\Theta_3$. The sweep angle $\Theta_3$ may be dictated by structural requirements of the nozzle 102 (e.g., strength and load) and aerodynamic drag. For example, the sweep angle $\Theta_3$ may be sufficiently small that the length of the spoke 120 is minimized for weight reasons while sufficiently large that the sweep of the spoke 120 is aerodynamically oriented to the airflow (e.g., like a high-speed aircraft's swept wings) in order to minimize drag. As one example, $\Theta_3$ may be between approximately 15 degrees and 50 degrees.

Figure 10:
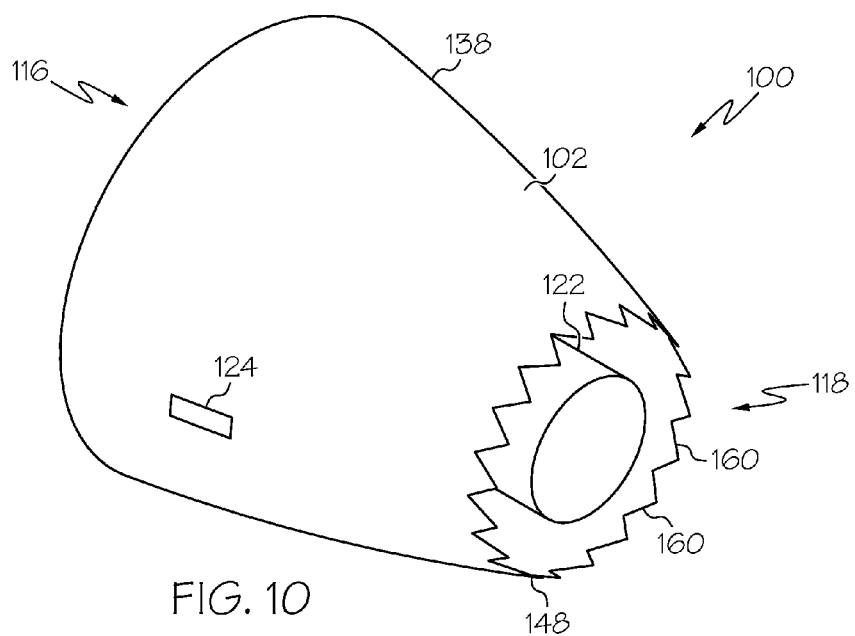
FIG. 10 is a schematic rear and side perspective view of another embodiment of the disclosed jet noise suppressor.

Referring to FIG. 10, in one example embodiment, the nozzle 102 may include nozzle chevrons 160 arranged around a periphery of the rear end 118 of the nozzle 102. As one example, the arrangement of nozzle chevrons 160 may be disposed along at least a portion of, or the entire circumference of, the rear end 118 of the nozzle 102. For example, the arrangement of nozzle chevrons 160 may project from the trailing edge 148 of the nozzle 102 (e.g., the wall structure 138). In one example construction, the nozzle chevrons 160 may project substantially parallel to the center axis A of the nozzle 102. In another example construction, the nozzle chevrons 160 may project radially inward. In another example construction, the nozzle chevrons 160 may project radially outward.

Each nozzle chevron 160 may include a major surface with a base integral to the nozzle 102 (e.g., the wall structure 138). In one example construction, the nozzle chevron 160 (e.g., the major surface thereof) may include a triangular shape (e.g., having a pointed end directed in the downstream direction), as best shown in FIG. 10. In another example construction, the nozzle chevron 160 may include a rectangular shape. In yet another example construction, the nozzle chevron 160 may include a trapezoidal shape (e.g., having a truncated edge directed in the downstream direction). Other unconventional nozzle chevron 160 shapes, for example, those including different camber and root properties to account for the slightly slower flow near the inner wall 114 of the nozzle 102 (FIG. 4A) are also contemplated.

The nozzle chevrons 160 may accelerate the mixing between an (e.g., third) ambient airflow stream 39 (e.g., an ambient airflow passing over an exterior of the nozzle 102) (FIG. 4B) and the main jet flow exhaust stream 24 (e.g., the inner exhaust stream 20 and the outer exhaust stream 22 located between the nozzle 102 and the center-body 122) (FIG. 4B). Thus, the nozzle chevrons 160 may mix three main streams, including the third ambient airflow stream 39 passing over an exterior of the nozzle 102, the first ambient airflow stream 46 passing through the nozzle 102, and the partially mixed engine exhaust stream 24 passing through the nozzle 102. By positioning (e.g., pressing) the tips of the nozzle chevrons 160 into the exhaust stream 24, the nozzle chevrons 160 may initiate stream-wise vortices that stir up an upstream shear layer and create a thickening effect on the upstream shear layer. A thickened upstream shear layer may lead to reduced amplification of the instability waves propagating downstream of the exhaust stream 24, thus reduce the intensity of large-scale turbulence structures (e.g., the main source of jet noise) developed downstream of the jet.

Figure 11:
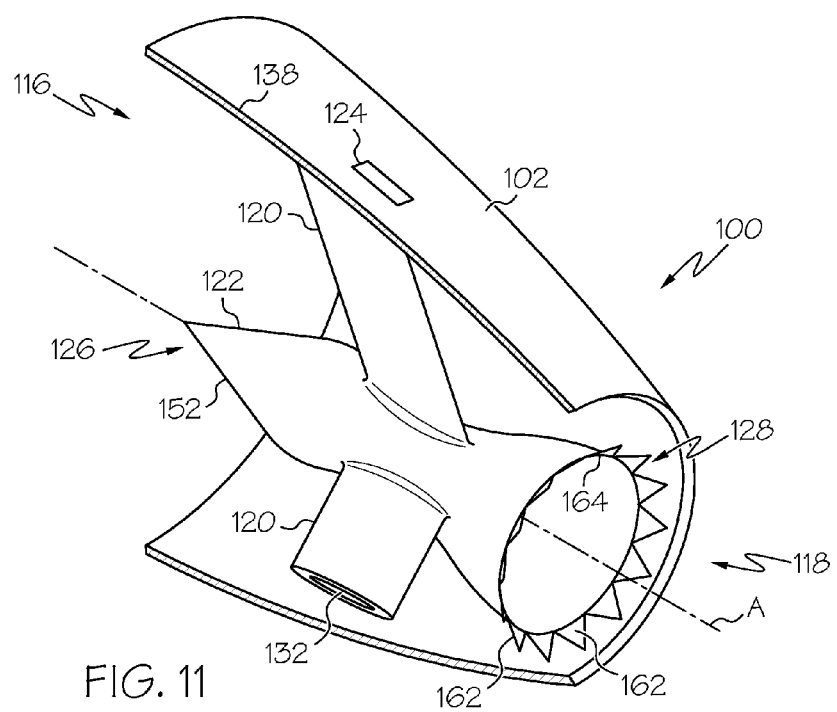
FIG. 11 is a schematic rear and side perspective view, in partial section, of another embodiment of the disclosed jet noise suppressor.

Referring to FIG. 11, in one example embodiment, the center-body 122 may include center-body chevrons 162 arranged around a periphery of the rear end 128 of the center-body 122. As one example, the arrangement of center-body chevrons 162 may be disposed along at least a portion of, or the entire circumference of, the rear end 128 of the center-body 122. For example, the arrangement of center-body chevrons 162 may project from a trailing edge 164 of the center-body 122 (e.g., the wall structure 152). In one example construction, the center-body chevrons 162 may project substantially parallel to the center axis A of the center-body 122. In another example construction, the center-body chevrons 162 may project radially inward (e.g., at approximately a 45-degree relative to the center axis A). In another example construction, the center-body chevrons 162 may project radially outward (e.g., at approximately a 45-degree angle relative to the center axis A).

Each center-body chevron 162 may include a major surface with a base integral to the center-body 122 (e.g., the wall structure 152). In one example construction, the center-body chevron 162 (e.g., the major surface thereof) may include a triangular shape (e.g., having a pointed end directed in the downstream direction). In another example construction, the center-body chevron 162 may include a rectangular shape. In yet another example construction, the center-body chevron 162 may include a trapezoidal shape (e.g., having a truncated edge directed in the downstream direction).

The noise reduction mechanism of the center-body chevrons 162 may be similar to that for the main nozzle chevrons 160. The center-body chevrons 162 may further increase the mixing in the shear layer between the main jet flow exhaust stream 24 (e.g., the inner exhaust stream 20 and the outer exhaust stream 22) and the induced second ambient airflow 26 (FIG. 4) exiting out of the center-body 122. Additionally, (e.g., for outwardly turned center-body chevrons 162) the center-body chevrons 162 may produce suction on a suction side of the center-body chevron 162 that results in a further incremental decrease in the base pressure region of the center-body 122 (e.g., an increase in suction), thereby resulting in an incremental increase in mass flow through the center-body 122.

In one example embodiment (not shown), the disclosed jet noise suppressor 100 may include both nozzle chevrons 160 (FIG. 10) arranged around the periphery of the rear end 118 of the nozzle 102 and center-body chevrons 162 (FIG. 11) arranged around the periphery of the rear end 128 of the center-body 122.

Referring to FIGS. 4A and 4B, in one example implementation of the disclosed jet noise suppressor 100, the first ambient airflow 46 and the second ambient airflow 26 may be entrained (e.g., captured) by the front end 116 and ambient airflow inlets 124 of the nozzle 102, respectively. The first ambient airflow 46 and second ambient airflow 26 may be approximately 15 percent to 40 percent of the exhaust streams 24 (e.g., the combined inner exhaust stream 20 and outer exhaust stream 22) entrained by the nozzle 102. The first ambient airflow 46 and second ambient airflow 26 may be cooler and slower than the exhaust streams 24. As the first ambient airflow 46 and second ambient airflow 26 mix with the exhaust streams 24, the resulting combined plume 50 (e.g., the mixture of exhaust streams 24 and ambient airflow 26 and ambient airflow 46) exiting the rear end 118 of the nozzle 102 may be both cooler and slower than the exhaust streams originating from the jet engine 16, thus, reducing noise generated by the jet engine 16.

Mixing the first ambient airflow 46 and second ambient airflow 26 with the exhaust streams 24 may provide a significant peak velocity reduction in the exhaust streams 24 and may also modify the structure of the exhaust stream plume 50 to disrupt regions of turbulent convected energy ("TKE") leading to faster decay, reduced low frequency noise, and less aft-radiated (e.g., more radially radiated) noise. In addition, the first ambient airflow 46 entrained at the front end 116 (e.g., the inlet) of the nozzle 102 upstream of the center-body 122 may slow down the shear layer magnitude difference at the boundary of the exhaust streams 24 and the ambient airflow 46.

The lobes 130 may change the sound directivity to propagate more radially than axially, which may prevent persistent propagation of sound in the axial direction.

Since the first ambient airflow 46 is mixed with the exhaust streams 24 as the exhaust streams 24 pass through the nozzle 102 and second ambient airflow 26 defines the inner (e.g., core) portion of the plume 50, and may be further mixed with the exhaust streams 24 when directed radially outward toward the periphery of the nozzle 102 by the lobes 130 of the center-body 122, the total length of the nozzle 102 required to achieve a noticeably noise reduction may be significantly less than a traditional noise suppression ejector. This smaller size of the nozzle 102 may reduce or avoid loss of propulsion efficiency of the jet engine 16.

Additionally, since the plume 50 is cooler than the exhaust streams 24, the radiative thermal emissions generated by the jet engine 16 may also be reduced. The reduced thermal emissions may provide a tactical benefit of a lower infrared ("IR") signature and/or observability of the aircraft 10.

Further, in one example construction, the wall structure 138 of the nozzle 102 may be fabricated from or include a thermally insulative or heat tolerant material to further reduce the IR signature of the jet engine 16.

Figure 12:
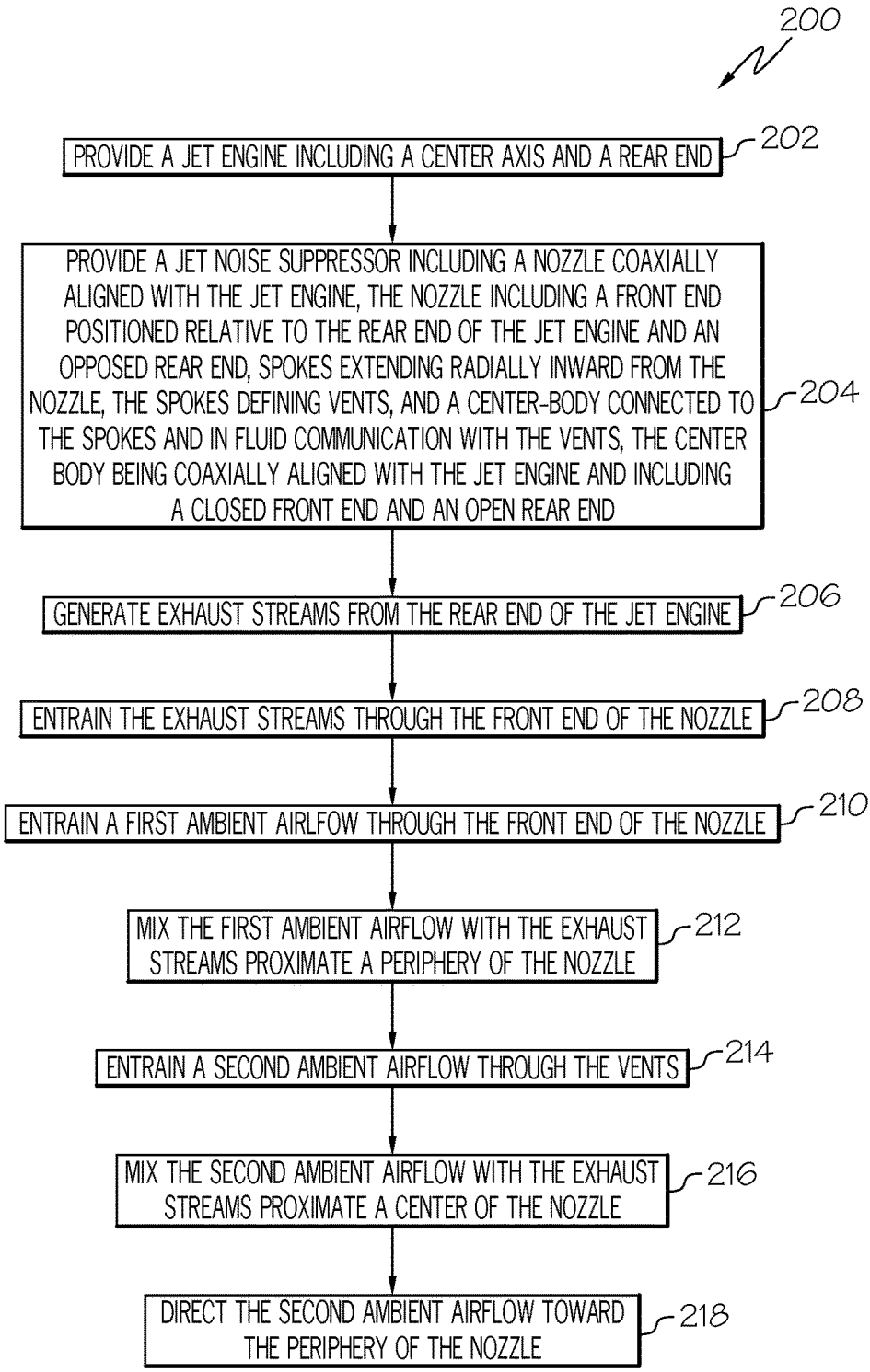
FIG. 12 is a flow diagram of one embodiment of the disclosed method for suppressing jet noise.

Referring to FIG. 12, one embodiment of the disclosed method, generally designated 200, for suppressing jet noise may begin by providing a jet engine including a center axis and a rear end, as shown at block 202.

As shown at block 204, a jet noise suppressor may be provided, the jet noise suppressor may include a nozzle coaxially aligned with the jet engine, the nozzle may include a front end positioned relative to the rear end of the jet engine and an opposed rear end, spokes extending radially inward from the nozzle, the spokes defining vents, and a center-body connected to the spokes and in fluid communication with the vents, the center body being coaxially aligned with the jet engine and including a closed front end and an open rear end.

As shown at block 206, exhaust streams (e.g., an inner exhaust stream and an outer exhaust stream) may be generated by the jet engine.

As shown at block 208, the exhaust streams may be entrained within the front end of the nozzle and pass through the nozzle to exit through the rear end of the nozzle.

As shown at block 210, a first ambient airflow may be entrained within the front end of the nozzle. For example, the first ambient airflow may pass through the nozzle to exit through the rear end of the nozzle proximate a periphery of the nozzle. For example, the first ambient airflow may be entrained by the first end and enter the nozzle through an open area defined between the front end of the nozzle and the rear end of the jet engine.

As shown at block 212, the first ambient airflow may be mixed with the exhaust streams proximate the periphery of the nozzle. For example, the first ambient airflow may be mixed with the exhaust streams within the nozzle about the periphery of the nozzle to both cool and decelerate the exhaust streams. The mixture of exhaust streams and first ambient airflow may exit the rear end of the nozzle, for example, about the periphery of the nozzle.

As shown at block 214, a second ambient airflow may be entrained within the vents. For example, the second ambient airflow may pass through the vents to exit through the rear end of the center-body proximate a center of the rear end of the nozzle. For example, the second ambient airflow may be entrained by ambient air inlets and enter the center-body through the vents defined by the spokes.

As shown at block 216, the second ambient airflow may be mixed with the exhaust streams proximate the center of the nozzle. For example, the second ambient airflow may be mixed with the exhaust streams about the center of the rear end of the nozzle to both cool and decelerate the exhaust streams. The mixture of exhaust streams and first ambient airflow may exit the rear end of the nozzle, for example, about the center of the nozzle.

As shown at block 218, the second ambient airflow may be directed toward the periphery of the nozzle. For example, the second ambient airflow may be directed toward the periphery of the nozzle by radially outward extending lobes of the rear end of the center-body to further mix the second ambient airflow with the exhaust streams to cool and decelerate the exhaust streams.

The first ambient airflow 46 may be entrained near the rear end 18 (e.g., the exit) of the jet engine 16 (e.g., the jet engine nozzle). The nozzle 102 may utilize a local vacuum developed at the open area 44 defined between the front end 116 of the nozzle 102 and the rear end 18 of the jet engine 16 to draw the ambient airflow 46 into the nozzle 102 through the front end 116. This first ambient airflow 46 may mix with the outer periphery portion of the high momentum exhaust streams 24 to reduce the differential airspeed at the shear layer noise source location, which reduces that noise source.

The second ambient airflow 26 may be entrained through the hollow spokes 120 (e.g., the vents 132) that connect the center-body 122 to the nozzle 102. This second ambient airflow 26 may be injected into a core of the exhaust streams 24 and mix with the central portion of the high momentum exhaust streams 24 to reduce the differential airspeed at the shear layer noise source location, which reduces that noise source.

The mixer lobes 130 integrated into and disposed about the periphery of the center-body 122 may stimulate mixing of the second ambient airflow 26 with the inner portion of the exhaust streams 24 (e.g., the portion of the exhaust streams 24 flowing around the center-body 122), which further accelerates decay and disruption of any associated TKE.

Accordingly, the disclosed jet noise suppressor 100 may achieve a noise reduction of approximately 5 dB to 6 dB. The noise reduction achieved by the disclosed jet noise suppressor 100 may be accomplished by the reduction of highly objectionable low-frequency noise in both the shear region (e.g., outer exhaust stream 22) and the core region (e.g., inner exhaust stream 20) of the plume 50 and changing the direction of the sound generated by the jet engine 16. To accomplish this, the disclosed jet noise suppressor 100 may include a short nozzle 102 (e.g., an ejector shroud) with an integrated ventilation system that effectively captures two ambient streams (e.g., the first ambient airflow 46 and the second ambient airflow 26) that mix with the outer exhaust stream 22 and the inner exhaust stream 20 to reduce the velocity of the exhaust streams 24.

Although various embodiment of the disclosed jet noise suppressor have been shown and described, modifications may occur to those skilled in the art upon reading the specification. The present application includes such modifications and is limited only by the scope of the claims.

What is claimed is:

1. A jet noise suppressor comprising:
   a nozzle configured to be coaxially aligned with a jet engine, said nozzle comprising a front end and an opposed rear end;
   spokes, each spoke comprising a first end connected to said nozzle and a second end extending radially inward from said nozzle, said spokes defining vents; and
   a center-body connected to said second ends of said spokes and in fluid communication with said vents, said center-body being positioned centrally within said nozzle and comprising a closed front end and an open rear end,
   wherein an open area between said front end of said nozzle and said jet engine entrains a first ambient airflow passing through said nozzle and exiting said rear end of said nozzle proximate a periphery of said rear end of said nozzle, said open area being upstream of said vents with respect to said first ambient airflow, and
   wherein said vents entrain a second ambient airflow passing through said center-body and exiting said rear end of said nozzle proximate a center of said nozzle.

2. The jet noise suppressor of claim 1, wherein said spokes are equally spaced apart relative to one another.

3. The jet noise suppressor of claim 2, wherein said spokes comprise three spokes.

4. The jet noise suppressor of claim 1, wherein said nozzle further comprises a wall structure extending circumferentially around a center axis, and wherein said vents define ambient airflow inlets through said wall structure.

5. The jet noise suppressor of claim 1, wherein said center-body further comprises lobes extending radially outward proximate said open rear end of said center-body, said lobes directing said second ambient airflow toward said periphery of said nozzle.

6. The jet noise suppressor of claim 1, wherein said jet engine comprises a rear end and exhausts exhaust streams from said rear end of said jet engine, and wherein said exhaust streams exiting from said rear end of said jet engine enter said front end of said nozzle, pass through said nozzle, and exit said rear end of said nozzle.

7. The jet noise suppressor of claim 6, wherein said first ambient airflow surrounds said exhaust streams and mixes with said exhaust streams, and wherein said second ambient airflow is surrounded by said exhaust streams and mixes with said exhaust streams.

8. The jet noise suppressor of claim 1, further comprising a coupling member removably connected to said jet engine of an aircraft, wherein said coupling member positions said front end of said nozzle relative to a rear end of said jet engine.

9. The jet noise suppressor of claim 1, wherein said nozzle is a first nozzle and said jet noise suppressor further comprises a second nozzle, and wherein said first nozzle and said second nozzle are each coaxially aligned with a respective jet engine of a pair of jet engines of an aircraft.

10. The jet noise suppressor of claim 1, wherein said center-body comprises a variable cross-sectional shape defining at least one inwardly curved region.

11. The jet noise suppressor of claim 1, further comprising a coupling member removably connected to a fuselage of an aircraft, wherein said coupling member positions said front end of said nozzle relative to a said rear end of said jet engine.

12. An aircraft comprising:
a jet engine comprising a center axis and a rear end, said jet engine being capable of generating exhaust streams to propel said aircraft; and
a jet noise suppressor comprising:
a nozzle coaxially aligned with said jet engine, said nozzle comprising a front end positioned relative to said rear end of said jet engine and an opposed rear end;
spokes extending radially inward from said nozzle, said spokes defining vents;
a center-body connected to said spokes and in fluid communication with said vents, said center body being coaxially aligned with said jet engine and comprising a closed front end and an open rear end; and
a coupling member removably connected to at least one of a fuselage and said jet engine of said aircraft, said coupling member positions said front end of said nozzle relative to said rear end of said jet engine, wherein:
said exhaust streams exiting from said rear end of said jet engine enter said front end of said nozzle, pass through said nozzle, and exit said rear end of said nozzle,
an open area between said front end of said nozzle and said rear end of said jet engine entrains a first ambient airflow passing through said nozzle and exiting said rear end of said nozzle proximate a periphery of said nozzle surrounding said exhaust streams and mixing with said exhaust streams, and
said vents entrain a second ambient airflow passing through said center-body and exiting said rear end of said nozzle proximate a center of said nozzle surrounded by said exhaust streams and mixing with said exhaust streams.

13. The aircraft of claim 12, wherein said spokes comprise three equally spaced apart spokes.

14. The aircraft of claim 12, wherein said nozzle further comprises a wall structure extending circumferentially around a center axis of said nozzle, and wherein said vents define ambient airflow inlets through said wall structure to entrain said second ambient airflow.

15. The aircraft of claim 12, wherein said center-body further comprises lobes extending radially outward proximate said open rear end of said center-body, said lobes directing said second ambient airflow toward said periphery of said nozzle.

16. The aircraft of claim 12, wherein said rear end of said jet engine comprises a diameter and said front end of said nozzle comprises a diameter, and wherein said diameter of said front end of said nozzle is greater than said diameter of said rear end of said jet engine defining said open area between said front end of said nozzle and said rear end of said jet engine configured to entrain said first ambient airflow.

17. The aircraft of claim 16, wherein said rear end of said jet engine is partially received within said front end of said nozzle.

18. The aircraft of claim 12, wherein said jet engine is a first jet engine of said aircraft and said nozzle is a first nozzle of said jet noise suppressor, wherein said aircraft further comprises a second jet engine disposed beside said first jet engine and said jet noise suppressor further comprises a second nozzle, and wherein said first nozzle and said second nozzle are respectively coaxially aligned with said first jet engine and said second jet engine.

19. A method for suppressing jet noise, said method comprising:
providing a jet engine comprising a center axis and a rear end;
providing a jet noise suppressor comprising:
a nozzle coaxially aligned with said jet engine, said nozzle comprising a front end positioned relative to said rear end of said jet engine and an opposed rear end;
spokes, each spoke comprising a first end connected to said nozzle and a second end extending radially inward from said nozzle, said spokes defining vents; and
a center-body connected to said second ends of said spokes and in fluid communication with said vents, said center body being coaxially aligned with said jet engine and comprising a closed front end and an open rear end;
generating exhaust streams from said rear end of said jet engine;
entraining said exhaust streams through said front end of said nozzle;
passing said exhaust streams through said nozzle;
entraining a first ambient airflow through an open area defined between said front end of said nozzle and said rear end of said jet engine, said open area being upstream of said vents with respect to said first ambient airflow;

passing said first ambient airflow through said nozzle surrounding said exhaust streams;

entraining a second ambient airflow through said vents;

passing said second ambient airflow through said centerbody surrounded by said exhaust streams;

mixing said first ambient airflow with said exhaust streams proximate a periphery of said nozzle; and mixing said second ambient airflow with said exhaust streams proximate a center of said nozzle.

20. The method of claim 19, further comprising directing said second ambient airflow toward said periphery of said nozzle.

* * * * *